United States Patent
Kim et al.

(10) Patent No.: US 9,800,304 B2
(45) Date of Patent: Oct. 24, 2017

(54) METHOD OF FEEDBACK FOR BEAMFORMING IN A WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/125,946

(22) PCT Filed: Feb. 17, 2015

(86) PCT No.: PCT/KR2015/001618
§ 371 (c)(1),
(2) Date: Sep. 13, 2016

(87) PCT Pub. No.: WO2015/137636
PCT Pub. Date: Sep. 17, 2015

(65) Prior Publication Data
US 2017/0078001 A1 Mar. 16, 2017

Related U.S. Application Data

(60) Provisional application No. 61/952,850, filed on Mar. 13, 2014.

(51) Int. Cl.
*H04B 7/02* (2017.01)
*H04B 7/0417* (2017.01)
(Continued)

(52) U.S. Cl.
CPC ......... *H04B 7/0417* (2013.01); *H04B 7/046* (2013.01); *H04B 7/0617* (2013.01);
(Continued)

(58) Field of Classification Search
CPC .................................................. H04B 7/0417
(Continued)

(56) References Cited

U.S. PATENT DOCUMENTS

| 2004/0147287 | A1* | 7/2004 | Nelson, Jr. | H01Q 3/26 455/561 |
| 2012/0258729 | A1* | 10/2012 | Siomina | G01S 3/28 455/456.1 |

(Continued)

FOREIGN PATENT DOCUMENTS

| KR | 10-2013-0053797 | 5/2013 |
| KR | 10-2013-0127376 | 11/2013 |

OTHER PUBLICATIONS

PCT International Application No. PCT/KR2015/001618, Written Opinion of the International Searching Authority dated May 27, 2015, 9 pages.

*Primary Examiner* — Lihong Yu
(74) *Attorney, Agent, or Firm* — Lee Hong Degerman Kang & Waimey

(57) ABSTRACT

A method of transmitting channel state information (CSI) for a hybrid beamforming from a user equipment in a wireless communication system according to one embodiment of the present invention may include measuring a gain of a directional beam formed with reference to a first direction and a gain of an omni-directional beam formed equivalently in all directions respectively and transmitting the CSI including a gain difference between the directional beam and the omni-directional beam to a base station, wherein a direction of a digital beamforming in the hybrid beamforming is determined in accordance with the gain difference between the directional beam and the omni-directional beam and wherein a direction of an analog beamforming in the hybrid beamforming is determined in accordance with the first direction.

13 Claims, 9 Drawing Sheets

(51) Int. Cl.
   *H04B 7/06*    (2006.01)
   *H04B 7/04*    (2017.01)
   *H04B 7/08*    (2006.01)

(52) U.S. Cl.
   CPC ......... *H04B 7/0626* (2013.01); *H04B 7/0639* (2013.01); *H04B 7/0689* (2013.01); *H04B 7/0871* (2013.01)

(58) Field of Classification Search
   USPC ...................................................... 375/267
   See application file for complete search history.

(56) References Cited

U.S. PATENT DOCUMENTS

| | | |
|---|---|---|
| 2013/0039445 A1 | 2/2013 | Hwang |
| 2013/0084908 A1 | 4/2013 | Joo |
| 2013/0109405 A1* | 5/2013 | Siomina ................ H04W 64/00 455/456.1 |
| 2013/0343303 A1 | 12/2013 | Kim et al. |

* cited by examiner

METHOD OF FEEDBACK FOR BEAMFORMING IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/001618, filed on Feb. 17, 2015, which claims the benefit of U.S. Provisional Application No. 61/952,850, filed on Mar. 13, 2014, the contents of which are all hereby incorporated by reference herein in their entirety.

TECHNICAL FIELD

The present invention relates to a method of feeding back information required for performing a beamforming in a wireless communication system and apparatus therefor.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

TECHNICAL TASK

The technical task of the present invention is to provide a method of efficiently transmitting feedback information for a beamforming in a wireless communication system and a method of performing a beamforming based on the feedback information.

Technical tasks obtainable from the present invention are non-limited by the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, a method of transmitting channel state information (CSI) for a hybrid beamforming from a user equipment in a wireless communication system according to one embodiment of the present invention may include measuring a gain of a directional beam formed with reference to a first direction and a gain of an omni-directional beam formed equivalently in all directions respectively and transmitting the CSI including a gain difference between the directional beam and the omni-directional beam to a base station, wherein a direction of a digital beamforming in the hybrid beamforming is determined in accordance with the gain difference between the directional beam and the omni-directional beam and wherein a direction of an analog beamforming in the hybrid beamforming is determined in accordance with the first direction.

To further achieve these and other advantages and in accordance with the purpose of the present invention, as embodied and broadly described, a method of receiving channel state information (CSI) for a hybrid beamforming, which is received by a base station in a wireless communication system, according to another embodiment of the present invention may include transmitting a first signal through a directional beam formed with reference to a first direction, transmitting a second signal through an omni-directional beam formed equivalently in all directions, and receiving the CSI including a gain difference between the directional beam and the omni-directional beam from a user equipment, wherein a direction of a digital beamforming in the hybrid beamforming is determined in accordance with the gain difference between the directional beam and the omni-directional beam and wherein a direction of an analog beamforming in the hybrid beamforming is determined in accordance with the first direction.

To further achieve these and other advantages and in accordance with the purpose of the present invention, as embodied and broadly described, in transmitting channel state information (CSI) for a hybrid beamforming in a wireless communication system, a user equipment according to further embodiment of the present invention may include a processor measuring a gain of a directional beam formed with reference to a first direction and a gain of an omni-directional beam formed equivalently in all directions respectively and a transmitter transmitting the CSI including a gain difference between the directional beam and the omni-directional beam to a base station under the control of the processor, wherein a direction of a digital beamforming in the hybrid beamforming is determined in accordance with the gain difference between the directional beam and the omni-directional beam and wherein a direction of an analog beamforming in the hybrid beamforming is determined in accordance with the first direction.

To further achieve these and other advantages and in accordance with the purpose of the present invention, as embodied and broadly described, in receiving channel state information (CSI) for a hybrid beamforming in a wireless communication system, a base station according to another further embodiment of the present invention may include a transmitter transmitting a first signal through a directional beam formed with reference to a first direction, the transmitter transmitting a second signal through an omni-directional beam formed equivalently in all directions, a receiver receiving the CSI including a gain difference between the directional beam and the omni-directional beam from a user equipment, and a processor determining a direction of a digital beamforming in the hybrid beamforming in accordance with the gain difference between the directional beam and the omni-directional beam, the processor determining a direction of an analog beamforming in the hybrid beamforming is determined in accordance with the first direction.

Preferably, a precoding matrix for the digital beamforming maybe determined based on the gain difference between the directional beam and the omni-directional beam.

Preferably, the directional beam may include an analog beam formed through the analog beamforming and indicates an angle range for forming a hybrid beam.

Preferably, the directional beam may be formed using prescribed RF (radio frequency) chains selected from a plurality of RF chains configured to perform the analog beamforming and the prescribed RF chains may be selected based on a plurality of antenna patterns configured to form directional analog beams equivalent to each other.

Preferably, the CSI may further include an indicator indicating whether the user equipment is located in a clockwise direction or a counterclockwise direction from the first direction.

Preferably, the directional beam may be rotated by a prescribed unit angle and the CSI may further include information on a direction having a maximum gain of the directional beam and a direction having a second highest again of the directional beam in response to a rotation of the directional beam.

ADVANTAGEOUS EFFECTS

According to an embodiment of the present invention, a size of feedback information required for a beamforming is reduced and the beamforming can be performed quickly and efficiently.

Effects obtainable from the present invention may be non-limited by the above mentioned effect. And, other unmentioned effects can be clearly understood from the following description by those having ordinary skill in the technical field to which the present invention pertains.

MODE FOR INVENTION

Reference will now be made in detail to the preferred embodiments of the present invention, examples of which are illustrated in the accompanying drawings. Configurations, functions and other features of the present invention can be easily understood through the embodiments of the present invention.

In the present specification, a name of a base station can be used as an inclusive terminology for RRH (remote control head), eNB, TP (transmission point), RP (repetition point), RN (relay) or the like. Moreover, in case of applying carrier aggregation, an operation of a base station described by the invention may be applicable to a component carrier (CC) or a cell. A beamforming covers the precoding concept and a weight vector/matrix for a beamforming covers the concept of a precoding vector/matrix.

MIMO Environment

Figure 1:
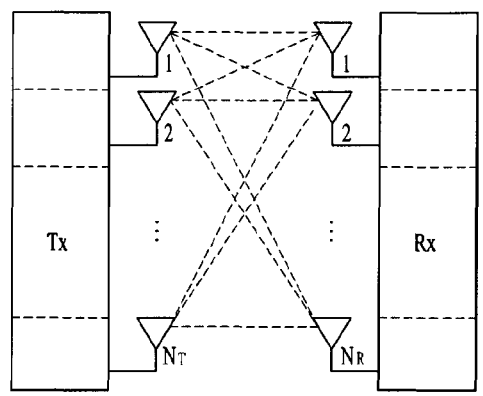
FIG. 1 is a diagram of a general MIMO environment.

A general MIMO (multi-input multi-output) environment is described with reference to FIG. 1 as follows.

$N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_O$, the transmission rate in case of using multiple antennas may be theoretically raised by a result from multiplying the maximum transmission rate $R_O$ by a rate increasing rate $R_i$, as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s=[s_1, s_2, \ldots, s_{N_T}]^T \qquad \text{[Formula 2]}$$

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \qquad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \qquad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \qquad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

The maximum number of transceiving antennas is assumed as 8 in a general MIMO environment. Yet, as the MIMO environment is evolved into a massive MIMO, the number of antennas can increase over tens or hundreds.

Figure 2:
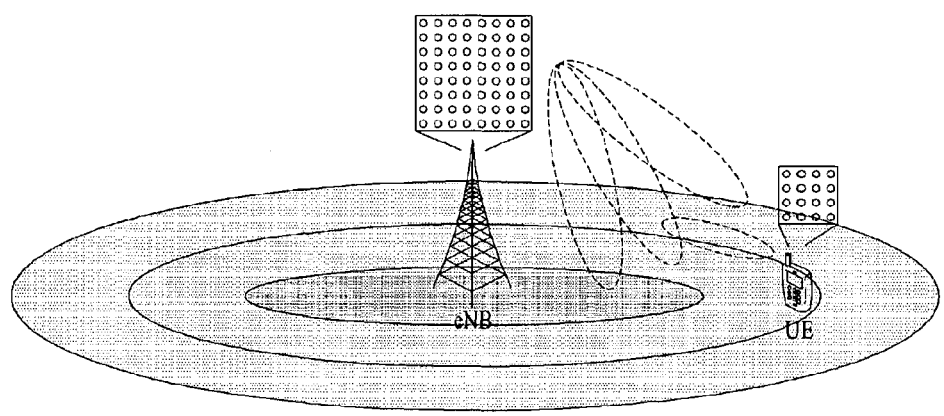
FIG. 2 is a diagram of a massive MIMO environment.

FIG. 2 shows one embodiment of a massive MIMO environment. Particularly, FIG. 2 diagrammatizes a system in which a base station or user equipment has a plurality of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of antennas. In doing so, it is advantageous in that the user equipment can set its transmission power to a very low power in consideration of a gain of the massive receiving antennas in order to reduce interference influence.

Analog Beamforming & Digital Beamforming

Figure 3:
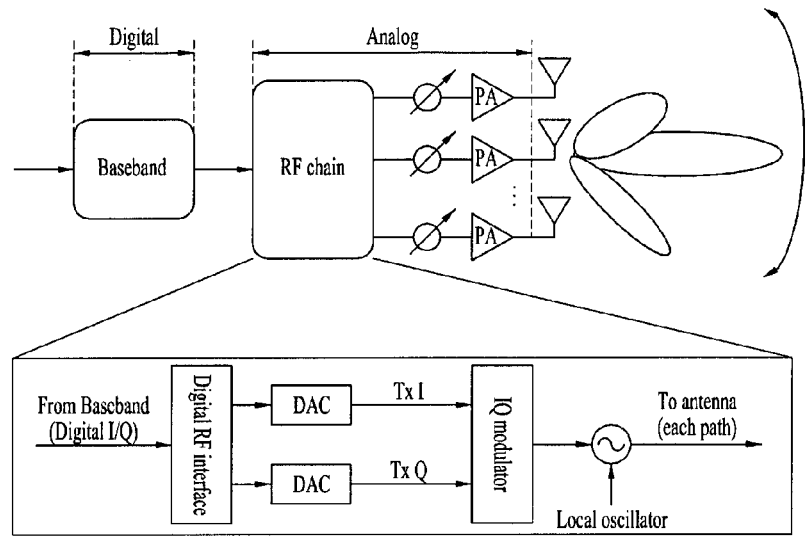
FIG. 3 is a diagram for one example of an analog beamforming scheme.

FIG. 3 is a diagram for one example of an analog beamforming scheme. An analog beamforming scheme is a representative beamforming scheme applied to an initial multi-antenna structure. A beamforming is performed in a manner as follows. First of all, after a digital signal processing has been completed, an analog signal is made to diverge into a plurality of paths. Secondly, phase shift (PS) and power amplification (power amplifier: PA) are set up on each of the diverging paths.

Referring to FIG. 3, an analog beamforming is performed in a manner that a power amplifier and a phase shifter connected to an antenna process an analog signal outputted from a single digital signal. In an analog stage, the phase shifter and the power amplifier applies a complex weight to the analog signal. In FIG. 1, an RF (radio frequency) chain means a processing block for converting a signal digital signal to an analog signal.

Yet, according to an analog beamforming scheme, accuracy of a beam is determined depending on characteristics of devices of the phase shifter and the power amplifier. Hence, in aspect of controlling the devices of the phase shifter and the power amplifier, the analog beamforming scheme is appropriate for a narrowband transmission. According to the analog beamforming scheme, since complexity of a hardware structure increases considerably in case of implementing a multi-stream transmission, it is difficult to improve a transmission rate through a multiplexing gain and it is also difficult to perform a beamforming per user based on orthogonal resource allocation.

Figure 4:
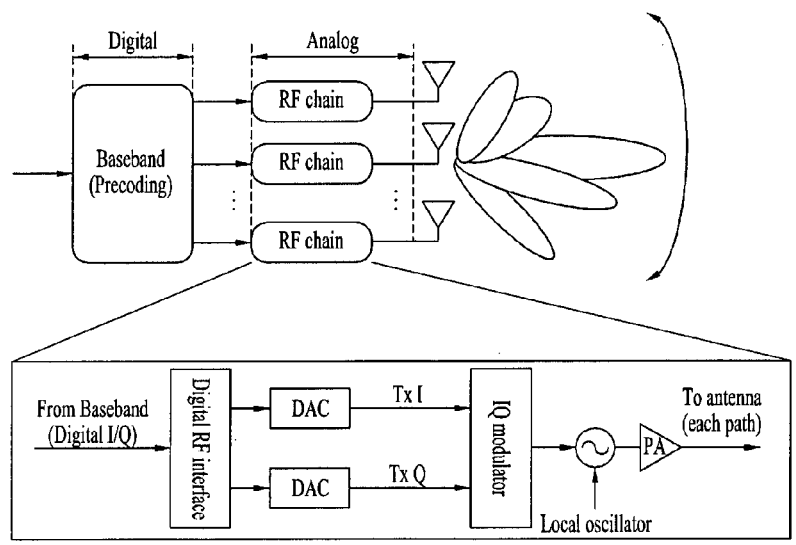
FIG. 4 is a diagram for one example of a digital beamforming scheme.

FIG. 4 is a diagram for one example of a digital beamforming scheme. According to the digital beamforming scheme, a beamforming is performed in a digital stage using a baseband process. Hence, unlike the analog beamforming scheme, the digital beamforming scheme is appropriate for maximizing diversity and multiplexing gain in an MIMO environment.

Referring to FIG. 4, application of a weight matrix (or a precoding matrix), e.g., a precoding is performed in a baseband process. In case of a digital beamforming, unlike the case of the analog beamforming shown in FIG. 1, an RF chain includes a power amplifier. The reason for this is that a complex weight for a beamforming is directly applied to a transmitted data.

Moreover, according to a digital beamforming scheme, it is able to form a beam different for each user. For instance, beams for multiple users can be simultaneously formed. Since it is possible to implement a digital beamforming independent for each user to which an orthogonal resource is allocated, a scheduling is relatively free and an operation of a transmitting stage in accordance with a system purpose is facilitated. Moreover, if MIMO-OFDM (orthogonal frequency division multiplexing) and technology are applied in a broadband transmission environment, it is able to form a beam independent per subcarrier. Thus, according to the digital beamforming scheme, since system capacity and beam gain are improved, a transmission rate for each user can be maximized.

In order to apply a digital beamforming technology in a massive MIMO environment, since a baseband processor should perform a precoding process for hundreds of antennas, digital signal processing complexity increases considerably. Moreover, since RF chains are required as many as the number of antennas, hardware implementation complexity increases considerably. Particularly, in case of FDD (frequency division duplex) system, since feedback information on massive MIMO channels for the entire antennas is required, it is disadvantageous in that a reference signal (or pilot signal) transmission and feedback overhead for the corresponding transmission are increased considerably.

If an analog beamforming technology is applied in a massive MIMO environment, hardware complexity of a transmitting stage is relatively low, an performance increase extent using multiple antennas is insignificant, and flexibility of resource allocation is lowered. Particular, in case of a broadband transmission, it is very difficult to control a beam per frequency.

Table 1 shows performance gain and complexity relations between an analog beamforming scheme and a digital beamforming scheme.

TABLE 1

| | Beamforming accuracy control facilitation | Multicarrier beam control | Multi-stream transmission | Hardware complexity (BB process) | Pilot and feedback overhead |
| --- | --- | --- | --- | --- | --- |
| Analog beamforming scheme | Low (PA/PS device characteristics and relation) | Impossible or difficult | Impossible or difficult | Low | Low |
| Digital beamforming scheme | High | Possible | Possible | High | High |

Modeling of Hybrid Beamforming

In a massive MIMO environment according to one embodiment of the present invention, instead of selectively applying one of an analog beamforming scheme and a digital beamforming scheme, it is able to apply a hybrid beamforming resulting from combining an analog beamforming structure and a digital beamforming structure together. Therefore, in order to lower hardware implementation complexity of a transmitting stage and to obtain a maximum beamforming gain using a massive MIMO, it is necessary to design a transmitting stage structure of a hybrid type.

Figure 5:
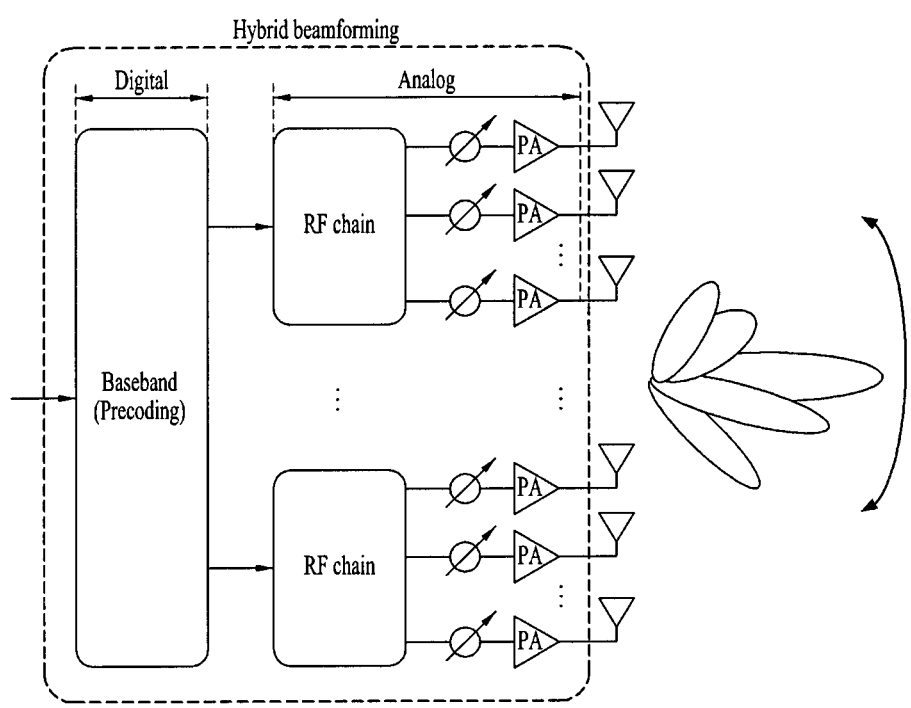
FIG. 5 is a diagram to describe the concept of a hybrid beamforming according to one embodiment of the present invention.

FIG. 5 is a diagram to describe the concept of a hybrid beamforming according to one embodiment of the present invention. According to a hybrid beamforming, a digital signal of a baseband having a digital beamforming scheme applied thereto is primarily converted to an analog signal of an RF band and an analog beamforming scheme is secondarily applied to the analog signal. Hence, for a hybrid beamforming scheme, a transmitting stage should be able to support both of the digital beamforming scheme and the analog beamforming scheme.

Items or matters taken into consideration for a hybrid beamforming are described as follows.

It is difficult to simultaneously optimize an analog beamforming and a digital beamforming. Basically, a digital beamforming is able to apply a beamforming scheme independent per user with the same time-frequency resource. On the other hand, an analog beamforming has a limitation such that a beamforming scheme common to users should be applied with the same time-frequency resource. The limitation of the analog beamforming causes difficulty in optimizing the supportable rank number, beam control flexibility and beamforming resolution in a hybrid beamforming.

An analog beamforming scheme for forming a beam in a specific direction only in the same time-frequency resource has difficulty in forming a plurality of beams in all user equipment direction at the same time. Hence, the analog beamforming scheme causes a problem that UL/DL control channel, reference signal, synchronization signal and the like are not transmitted simultaneously to all user equipments distributed in all areas in a cell.

In case of performing channel estimation on an analog/digital beam, a digital beamforming scheme can use an existing orthogonal pilot assignment as it is. Yet, in an analog beamforming scheme, a time-duration amounting to the number of beam candidates is required. A time delay taken for a channel estimation of an analog beam is relatively long. In case of estimating a digital beam and an analog beam simultaneously, complexity increases considerably.

According to a digital beamforming scheme, a beamforming for multiple users/streams is free. Yet, according to an analog beamforming scheme, since a beamforming by the same weight vector/matrix is performed on a full transmission band, it is difficult to perform a beamforming independent per user or stream. Particularly, since FDMA (e.g., OFDMA) support through orthogonal frequency resource allocation is difficult, it is difficult to optimize a frequency resource.

In the following description, feedback methods for a hydro beamforming are explained in consideration of the features or properties mentioned in the foregoing description. First of all, in an existing mobile communication system that uses one of an analog beamforming scheme and a digital beamforming scheme, performing a closed loop based beamforming (or precoding) is facilitated. For instance, a user equipment receives a reference signal transmitted by a base station and then determines a precoding matrix index (PMI), a rank indicator (RI), and a channel quality indicator (CQI). The user equipment feeds back a channel state information (CSI) containing the PMI, CQI and/or RI to the base station. Subsequently, the base station performs a beamforming using the PMI transmitted by the user equipment. Alternatively, the base station may perform a beamforming using a different PMI without being restricted by the PMI transmitted by the user equipment.

Thus, in case that the existing method is intactly applied to a hybrid beamforming, a user equipment should measure and report a PMI for an analog beamforming and a PMI for a digital beamforming, respectively. Hence, overhead for the measurement and reporting increases twice. Moreover, if the PMI for the analog beamforming and the beamforming for the digital beamforming are different from each other, it causes another problem. For instance, assuming that an optimal PMI for an analog beamforming and an optimal PMI for a digital beamforming indicate a zero-degree direction and a 30-degree direction, respectively, since a direction of an analog beam and a direction of a digital beam are different from each other, a gain of a hydro beamforming may be represented as low considerably.

According to one embodiment of the present invention, it is able to determine a PMI for a digital beamforming based on a measurement of an analog beam. For instance, a user equipment feeds back only a measurement result of an analog beam to a base station and may not feed back a PMI for a digital beamforming. For another instance, a user equipment may determine a PMI for a digital beamforming using a measurement result of an analog beam. A measurement result of the analog beam and the PMI for the digital beamforming may be fed back to a base station.

Figure 6:
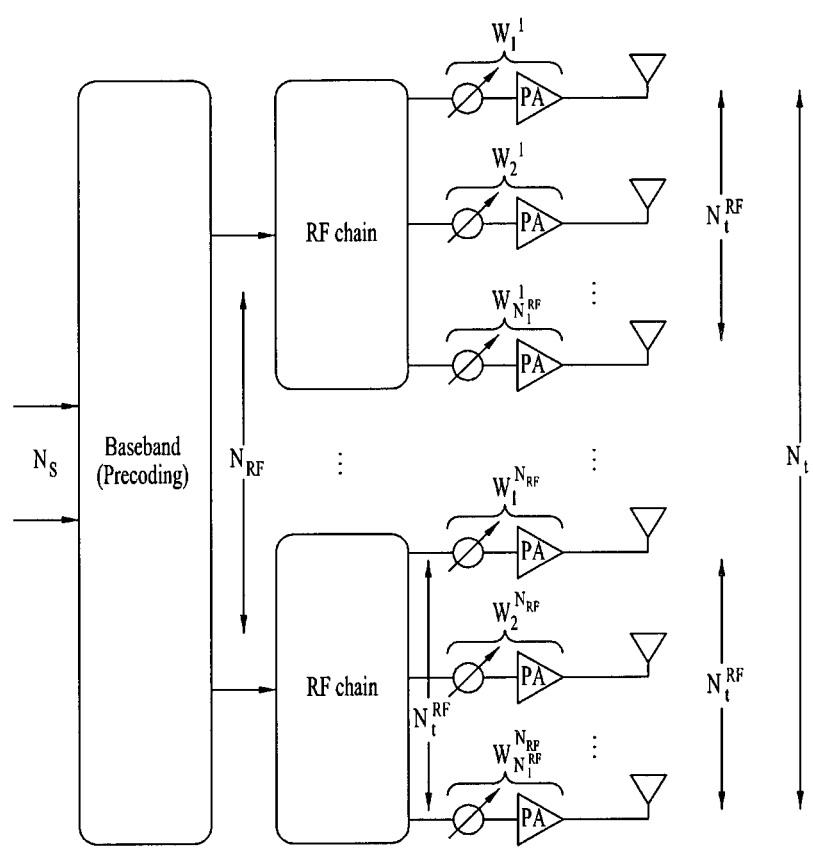
FIG. 6 is a diagram of a structure of a transmitting stage for performing a hybrid beamforming according to one embodiment of the present invention.

FIG. 6 is a diagram of a structure of a transmitting stage for performing a hybrid beamforming according to one embodiment of the present invention. According to the present embodiment, each RF chain is assumed as including $N_t^{RF}$ independent antennas, by which the present embodiment is non-limited. For instance, the number of antennas provided to each RF chain may be configured differently.

According to the present embodiment, a relation of $N_t = N_t^{RF} \times N_{RF}$ exists among the total antenna number $N_t$, the RF chain number $N_{RF}$ and the per-RF chain antenna number $N_t^{RF}$. Since a signal having passed through a phase shifter and a power amplifier per RF chain is sent to a transmitting antenna, a system model can be defined as Formula 8.

$$y_k = H_k F^{RF} F_k^{BB} s_k + z_k \quad \text{[Formula 8]}$$

In Formula 8, the k indicates a subcarrier index. The subcarrier index k has a value ranging 0 to $(N_{FFT}-1)$. The $N_{FFT}$ indicates a maximum FFT (Fast Fourier Transform) size supported by a system. And, the total subcarrier number may be limited to a range within the FFT size.

The $y_k$ means a received signal vector having a size '$N_r \times 1$' in the subcarrier k. The $H_k$ means a channel matrix having a size of '$N_r \times N_t$' in the subcarrier k. The $F^{RF}$ means an RF precoder (i.e., a weight matrix for an analog beamforming) having a size of '$N_t \times N_t$' in a whole subcarrier. And, the RF precoder (analog beamforming) may be identically applicable to the whole subcarrier. The $F_k^{BB}$ means a baseband precoder (i.e., a weight matrix for a digital beamforming) having a size of '$N_{RF} \times N_S$' in the subcarrier k. And, the baseband precoder (digital beamforming) may be individually configured per subcarrier. The $s_k$ indicates a transmitted signal vector having a size of '$N_s \times 1$' in the subcarrier k and the $z_k$ indicates a noise signal vector having a size of '$N_r \times 1$' in the subcarrier k.

The $N_{RF}$ indicates the total number of RF chains, the $N_t$ means the total number of the transmitting stage antennas, and the $N_t^{RF}$ means the number transmitting antennas provided per RF chain. The $N_r$ indicates the total number of the receiving stage antennas and the $N_s$ indicates the number of transmitted data streams.

Each term in Formula 8 is represented in detail as Formula 9.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} F^{RF} \left( \begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(Nr)} \end{bmatrix}$$

[Formula 9]

The '$N_t \times N_{RF}$' precoding matrix $F^{RF}$ of an analog beamforming performed after an RF chain by a phase shifter and a power amplifier can be expressed as Formula 10 in the following.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix}$$

[Formula 10]

Moreover, a vector indicating a weight for each of t antennas belonging to an RF chain I in the precoding matrix $F^{RF}$ can be defined as Formula 11 in the following.

$$w^j_{N_t^{RF}} = \begin{bmatrix} w^j_1 \\ w^j_2 \\ \vdots \\ w^j_{N_t^{RF}} \end{bmatrix}$$ [Formula 11]

Beam Radiation Pattern of Hybrid Beamforming

A hybrid beamforming scheme of the present invention can be performed based on one of antennas of various types including a 1D array, a 2D array, a ring type array and the like. For clarity of the following description, a beam radiation pattern of a hybrid beamforming is described based on ULA (Uniform linear array) antenna. The ULA antenna is exemplarily illustrated, by which the scope of the appended claims and their equivalents is non-limited. In the ULA antenna, a plurality of antenna elements are linearly arrayed in a manner of being spaced apart from each other by an equal space d.

An array response vector of the ULA antenna is expressed as Formula 12 in the following.

$$a(\theta) = \left[ 1 \exp\left(j2\pi \times 1 \times \frac{d}{\lambda}\sin(\theta)\right) \right.$$
$$\left. \exp\left(j2\pi \times 2 \times \frac{d}{\lambda}\sin(\theta)\right) \ldots \exp\left(j2\pi \times (N_t - 1) \times \frac{d}{\lambda}\sin(\theta)\right) \right]$$ [Formula 12]

In Formula 12, the $\lambda$ indicates a wavelength and the d indicates an inter-antenna distance. For clarity, in order to represent an antenna radiation pattern of a hybrid beamformer, the RF chain number $N_{RF}$ is assumed as 4 and the per-RF chain analog antenna number $N_t^{RF}$ is assumed as 4.

Figure 7:
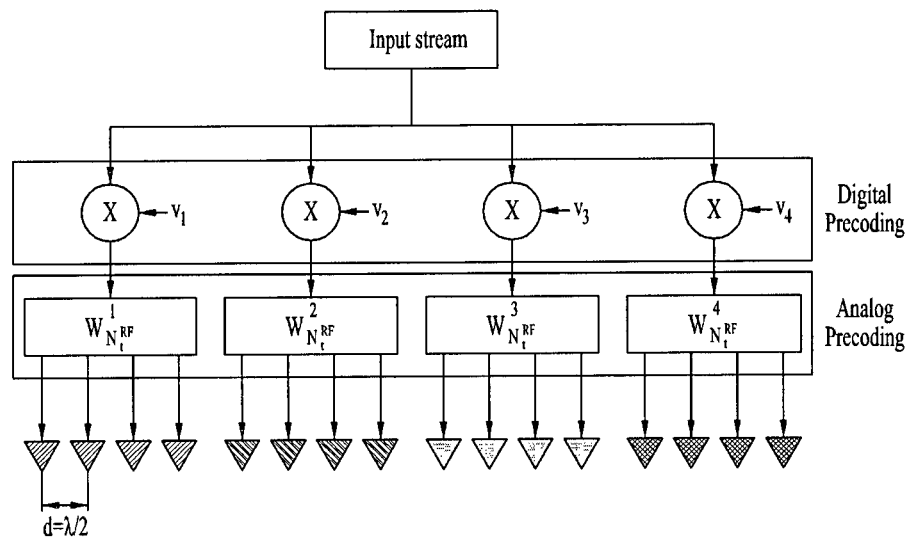
FIG. 7 is a diagram of 16-ULA antenna structure configured with 4 RF chains according to one embodiment of the present invention.

FIG. 7 is a diagram of 16-ULA antenna structure configured with 4 RF chains according to one embodiment of the present invention. Particularly, in FIG. 7, the total transmitting antenna number $N_t$ is 16 and it is d=$\lambda$/2. According to the example shown in FIG. 7, a precoding matrix for an analog beamforming is defined as Formula 13.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix},$$ [Formula 13]

$$w^j_{N_t^{RF}} = \begin{bmatrix} w^j_1 \\ w^j_2 \\ w^j_3 \\ w^j_4 \end{bmatrix}$$

In order to form a beam toward a boresight, i.e., a direction of a center of a main lobe of a radio wave radiating from an antenna, a steering angle of the beam is set to 0°. Hence, a value of each of elements of weight vectors of an analog precoding matrix becomes 1. In this case, a random weight vector of a rank 1, which is to be applied to a digital beamforming stage, is defined as Formula 14 in the following. For clarity, a rank 1 is assumed, by which the present invention is non-limited.

$$F^{BB} = v_1 = [v_1 \ v_2 \ v_3 \ v_4]^T$$ [Formula 14]

A antenna array response vector to which the digital beamforming of Formula 14 is applied at the boresight ($\theta=0°$) can be represented as Formula 15. In this case, an inter-antenna distance d is assumed as $\lambda/2$.

$$\sum a(\theta) =$$ [Formula 15]
$$\sum_{i=0}^{15} a_i(\theta) = (1 + \exp(j\pi \times \sin(\theta)) + \exp(j\pi 2 \times \sin(\theta)) +$$
$$\exp(j\pi 3 \times \sin(\theta))) \times v_1 +$$
$$(\exp(j\pi 4 \times \sin(\theta)) + \exp(j\pi 5 \times \sin(\theta)) +$$
$$\exp(j\pi 6 \times \sin(\theta)) + \exp(j\pi 7 \times \sin(\theta))) \times v_2 +$$
$$(\exp(j\pi 8 \times \sin(\theta)) + \exp(j\pi 9 \times \sin(\theta)) +$$
$$\exp(j\pi 10 \times \sin(\theta)) + \exp(j\pi 11 \times \sin(\theta))) \times v_3 +$$
$$(\exp(j\pi 12 \times \sin(\theta)) + \exp(j\pi 13 \times \sin(\theta)) +$$
$$\exp(j\pi 14 \times \sin(\theta)) + \exp(j\pi 15 \times \sin(\theta))) \times v_4$$

Formula 15 can be summarized into Formula 16.

$$\sum a(\theta) = \begin{pmatrix} 1 + \exp(j\pi\sin(\theta)) + \exp(j\pi 2\sin(\theta)) + \\ \exp(j\pi 3\sin(\theta)) \end{pmatrix} \times$$ [Formula 16]
$$\begin{pmatrix} v_1 + \exp(j\pi 4\sin(\theta)) \cdot v_2 + \\ \exp(j\pi 8\sin(\theta)) \cdot v_3 + \exp(j\pi 12(\theta)) \cdot v_4 \end{pmatrix}$$
$$= \left(\sum_{i=1}^{4} s_i\right) \times \left(\sum_{i=1}^{4} t_i\right) = \sum s \times \sum t$$

The s in Formula 16 is expressed as Formula 17 and shall be named a beam bound vector. And, the t in Formula 16 is expressed as Formula 18 and shall be named a beam gain and steering vector or a beam steering vector.

$$s = \begin{bmatrix} 1 \\ e^{j\pi \sin(\theta)} \\ e^{j\pi 2\sin(\theta)} \\ e^{j\pi 3\sin(\theta)} \end{bmatrix}$$ [Formula 17]

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix}$$ [Formula 18]

The beam bound vector s indicates a pattern of an analog beam in a hybrid beamforming. The beam steering vector t indicates a gain of a hybrid beam and a pattern of a digital beam in a hybrid beamforming.

The beam bound vector s determines a range and boundary for forming a hybrid beam validly by a hybrid beamforming scheme. Hence, a range of a digital beamforming is limited within a beam bound vector as well as a range of an analog beamforming. For instance, since an analog beam cannot be validly formed over the range of the beam bound vector, it is unable to perform a hybrid beamforming over the range of the beam bound vector. Eventually, since the digital beamforming should be performed within the range of the beam bound vector, it is able to perform the hybrid beamforming.

Figure 8:
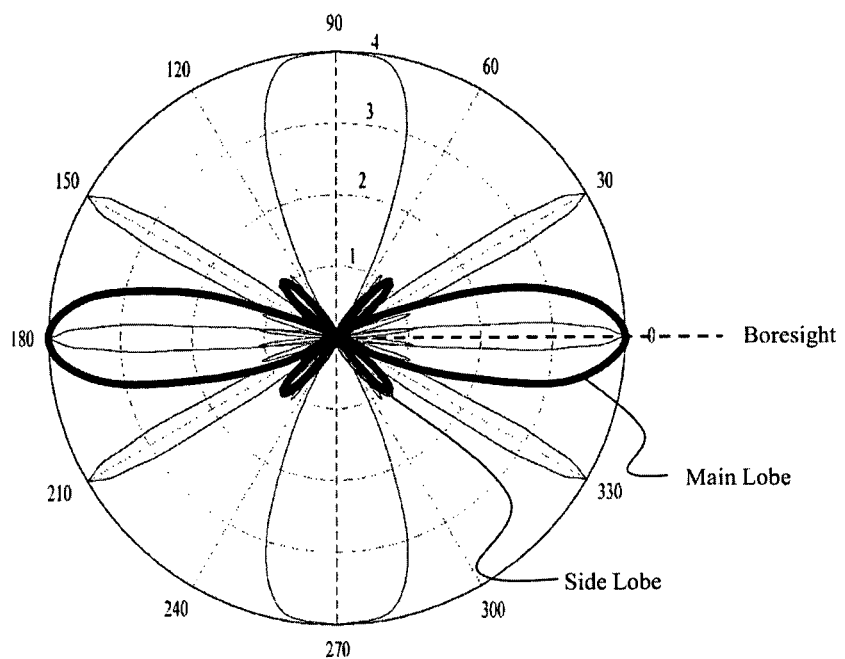
FIG. 8 is a diagram of beam patterns by a beam bound vector and a beam steering vector.

FIG. 8 shows patterns of an analog beam and a digital beam by a beam bound vector and a beam steering vector in a prescribed plane 2-dimensionally. Although an analog beam and a digital beam can be illustrated in 3D pattern, it is apparent to those skilled in the art that they are illustrated in horizontal cross-sections for clarity of the following description. In FIG. 8, $N_t=16$, $N_t^{RF}=4$, $N_{RF}=4$ are assumed. A beam pattern of a beam bound vector is denoted by a thick line, while a beam pattern of a beam steering vector is denoted by a thin line. A boresight of a main lobe of the beam bound vector is 0 degree (or 180 degrees).

A pattern of each beam has a maximum gain at a beam steering angle (i.e., a boresight of a main lobe). As the pattern deviates from the beam steering angle, a beam gain is reduced. The beam gain is represented as a distance from a circle center shown in FIG. 8. A steering angle of a beam is represented as increasing counterclockwise with reference to zero degree.

A beam steering vector can form a beam at 0 degree, 30 degrees, 90 degrees, 150 degrees, 180 degrees, 210 degrees, 270 degrees, or 330 degrees. A hybrid beamforming can be performed in an area where a beam pattern of a beam bound vector and a beam pattern of a beam steering vector cross with each other. For instance, when a steering angle is 0 (or 180), since a gain by a beam bound vector and a gain by a beam steering vector become maximum values, respectively, it is appropriate for a hybrid beamforming to be performed at a point where a steering angle is 0 degree (or 180 degrees). On the other hand, when a steering angle is 30 degrees, since a gain of a beam bound vector is 0, it is unable to perform a hybrid beamforming on the steering angle '30 degrees'.

Figure 9:
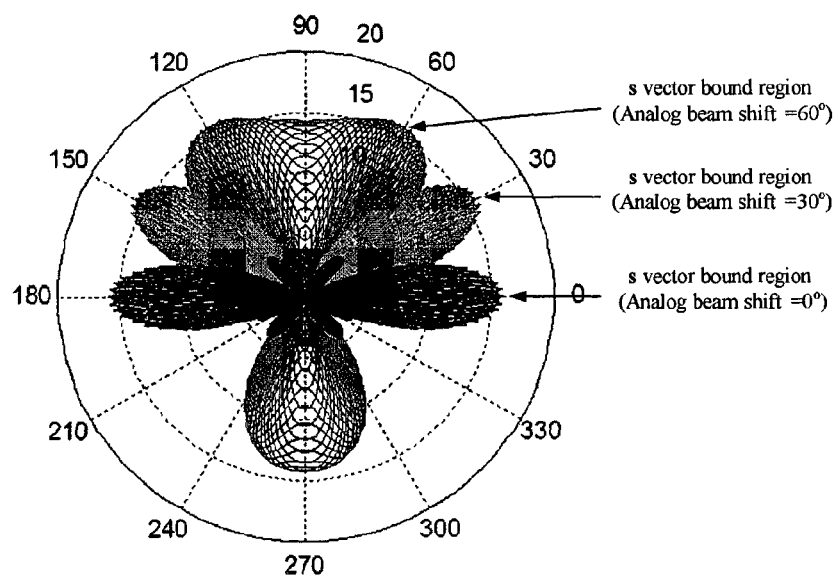
FIG. 9 is a diagram of a beam pattern of a final antenna array response vector in response to an analog beam transition according to one embodiment of the present invention.

FIG. 9 shows an antenna array response when a steering angle of an analog beam is shifted at 0 degree, 30 degrees, or 60 degrees. In FIG. 8, it is assumed that $N_t=16$, $N_t^{RF}=4$, $N_{RF}=4$. And, a result from applying digital $v_1=[v_1\ v_2\ v_3\ v_4]^T$ is shown in FIG. 9. As mentioned in the foregoing descriptions with reference to FIG. 8 and FIG. 9, a range of a valid beam is limited by the vector s.

Reference Beam Forming

Figure 10:
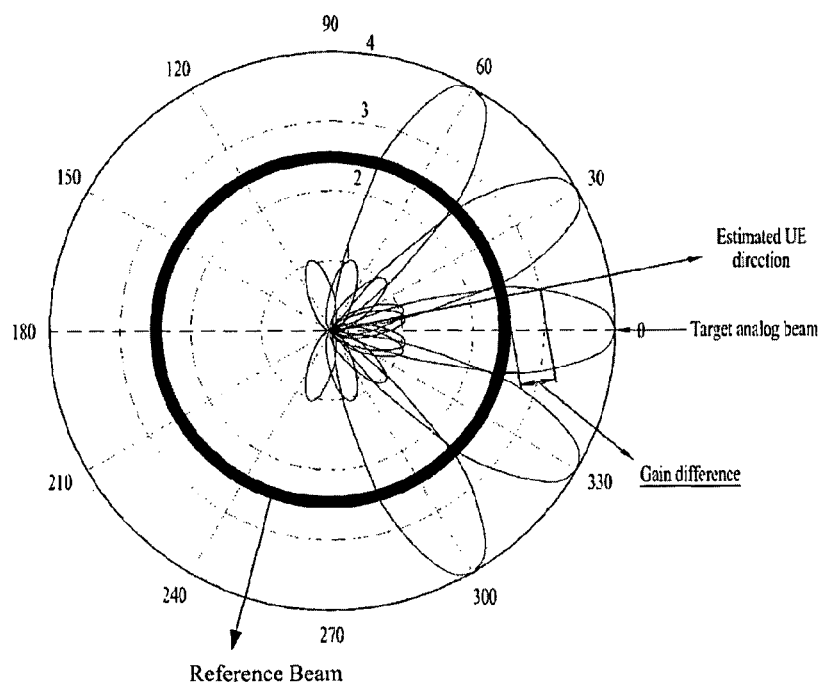
FIG. 10 is a diagram for one example of a method of calculating a gain difference between a reference beam and a bounded beam according to one embodiment of the present invention.

According to one embodiment of the present embodiment, a reference beam is proposed. A reference beam, as shown in FIG. 10, can be designed to have the same beam gain in omni-directions. For instance, a base station can form a reference beam through an omni-directional antenna. According to another embodiment, a base station is able to from an omni-directional beam having a beam gain of 0 dB using a single antennal. According to further embodiment of the present embodiment, a base station is able to generate a directional beam using multiple antennas and is also able to form an omni-directional beam approximately for a prescribed area.

A base station is able to periodically transmit a reference beam. And, a transmission period of the reference beam may be set for a user equipment by RRC signaling or may be broadcasted as a portion of system information. A reference beam may be generated based on a reference signal, by which the present invention is non-limited.

In case of ignoring an environment that causes interference, noise, propagation hindrance from neighbor cells or other user equipments, a gain of a reference beam is identical for all steering angles. For all directions having the same straight-line distance between a base station and a user equipment, gains of a reference beam are equal to each other. A transmission power of a base station for forming a reference beam is uniformly fixed or may be fixed to a cell-specific value. A gain of a reference beam may vary depending on a distance from a base station. In particular, the farther a distance from a base station gets, the less a gain of a reference beam becomes. Hence, a gain of a reference beam may be used as an index for a straight-line distance between a base station and a user equipment.

Gain Difference Between Reference Beam and Bounded Beam

As mentioned in the foregoing description, although a digital beamforming is performed in all directions by fixing a direction of an analog beamforming (e.g., $F^{RF}$ fixed), a range of a formable hybrid beam is limited to a range within a beam bound vector. Hereinafter, a beam of a beam bound vector shall be named a bounded beam. Since a digital beamforming component is excluded from a bounded beam, a bounded beam in a hybrid beamforming can be formed through an equivalent analog beamforming.

According to one embodiment of the present embodiment, through a difference between a gain of a reference beam measured by a user equipment and a gain of a bounded beam measured by the user equipment, a user equipment located direction from a base station can be estimated. For instance, a base station forms bounded beams ($F^{RF}=0°$, ±30°, ±60° through an analog beamforming. In this case, the steering angles of the bounded beams can be changed variously. In case of increasing resolution, a beamforming may be performed by a unit smaller than 30.

A base station forms bounded beams sequentially for respective steering angles or may be able to form bounded beams in multiple directions through different analog devices simultaneously. For instance, a specific timing and angle for a base station to form a bounded beam are previously defined, broadcasted through a system information, or set at a user equipment through RRC signaling.

FIG. 10 is a diagram for one example of a method of calculating a gain difference between a reference beam and a bounded beam according to one embodiment of the present invention. Referring to FIG. 10, a user equipment (UE) is located on a straight line in an estimated UE direction. A gain ($G_{ref}$) of a reference beam appears at a point where a straight line indicating a UE located direction and a circle indicating the reference beam cross with each other. Similarly, a gain ($G_{mea}$) of a bounded beam appears at a point where a straight line indicating a UE located direction and a bounded beam (0°) cross with each other. Meanwhile, since a user equipment is unable to measure bounded beams formed at different steering angles (e.g., 30°, 60°, etc.), a gain of a beam does not appear.

A difference between a gain ($G_{ref}$) of a reference beam and a gain ($G_{mea}$) of a bounded beam is defined as Formula 19.

$$G_{diff}=G_{mea}-G_{ref}(\text{dB}) \qquad \text{[Formula 19]}$$

According to one embodiment of the present invention, a user equipment transmits feedback information to a base station based on a difference ($G_{diff}$) between a gain ($G_{ref}$) of a reference beam and a gain ($G_{mea}$) of a bounded beam. For instance, the user equipment is able to transmit the difference ($G_{diff}$) to the base station. According to another embodiment of the present invention, a user equipment individually measures a gain ($G_{ref}$) of a reference beam and a gain ($G_{mea}$) of a bounded beam and may be then able to feed back the measured gains simultaneously or separately.

Selection of Antenna for Bounded Beamforming

Figure 11:
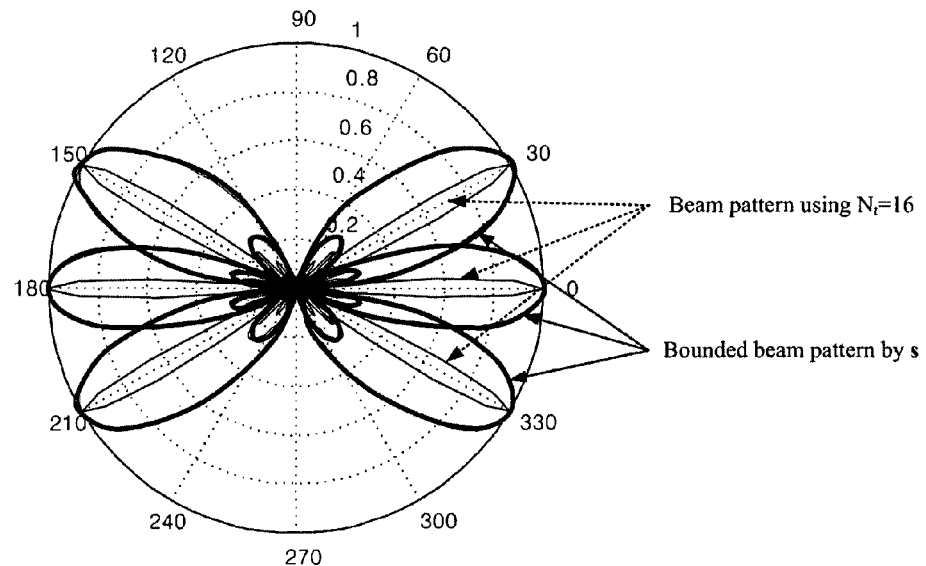
FIG. 11 is a diagram of a bounded beam and an array response beam according to one embodiment of the present invention.

A hybrid beam formed using $N_t$ antennas gets sharper than a bounded beam. FIG. 11 is a diagram of a bounded beam S formed using 4 antennas and an array response beam ($N_T$=16) formed using 16 antennas according to one embodiment of the present invention. The more the antennas are user, the sharper the beam gets. When an exhaustive search for combinations of an analog beam and a digital beam is performed in order to extract a pattern of a hybrid beam appropriate for a bounded beam, as a bounded beam gets narrower, it gets more difficult to derive a pattern of an appropriate beam and a more time delay may be taken for the exhaustive search. In order to improve such disadvantages, according to one embodiment of the present invention, it is able to form a bounded beam based on antenna on/off patterns for forming equivalent bounded beams.

For instance, assuming a ULA of the structure in which the number of transmitting antennas included in each RF chain is equal, it is able to generate a second bounded beam equivalent to a first bounded beam formed by a first RF chain using a second RF chain. Thus, it is able to define the antenna on/off patterns for generating the equivalent bounded beams. Table 2 shows one example of per-RF chain antenna on/off patterns for forming equivalent bounded beams. In Table 2, assume $N_t$=16, $N_t^{RF}$=4, $N_{RF}$=4.

TABLE 2

| Antenna on/off pattern (Null pattern) | Triggering RF chain ($N_{RF}$ = 4) | Final pattern ($N_t^{RF}$ = 4, $N_t$ = 16) |
|---|---|---|
| Pattern #1 | [1 0 0 0] | [1 1 1 1 0 0 0 0 0 0 0 0 0 0 0 0] |
| Pattern #2 | [0 1 0 0] | [0 0 0 0 1 1 1 1 0 0 0 0 0 0 0 0] |
| Pattern #3 | [0 0 1 0] | [0 0 0 0 0 0 0 0 1 1 1 1 0 0 0 0] |
| Pattern #4 | [0 0 0 1] | [0 0 0 0 0 0 0 0 0 0 0 0 1 1 1 1] |

For instance, if the pattern #2 is selected, a bounded beam is formed using 4 analog beamforming devices (e.g., phase shifters and amplifiers) included in a second RF chain. According to the pattern #2, the array response vector shown in Formula 15 is summarized into Formula 20. If a weight element $v_2$ for a digital beamforming in Formula 20 is set to 1, Formula 20 becomes an array response vector of a general ULA having 4 antenna elements.

$$\Sigma a(\theta)=(1+\exp(j\pi \sin(\theta))+\exp(j\pi 2 \sin(\theta))+\exp(j\pi 3 \sin(\theta)))\times(v_1+\exp(j\pi 4 \sin(\theta))\cdot v_2+\exp(j\pi 8 \sin(\theta))\cdot v_3+\exp(j\pi 12 \sin(\theta))\cdot v_4) \rightarrow (1+\exp(j\pi \sin(\theta))+\exp(j\pi 2 \sin(\theta))+\exp(j\pi 3 \sin(\theta)))\times v_2 \quad \text{[Formula 20]}$$

Feedback for Hybrid Beamforming

As mentioned in the foregoing description, a steering angle of a digital beamforming is limited to a range of a bounded beam. Since it is unable to perform an analog beamforming beyond the range of the bounded beam, a range of the digital beamforming is eventually limited to the range of the bounded beam available for the analog beamforming.

Meanwhile, in case of a digital beamforming that can control a steering angle more precisely and easily than an analog beamforming, it is preferable that a digital beam is formed accurately in a UE located direction. For instance, if a straight line indicating a UE located direction is made to match a boresight of a digital beam in FIG. 10, it is preferable to maximize a gain of a hybrid beamforming. Particularly, if a digital beam is formed narrow and sharp, if a steering angle mismatches a UE direction, a gain of a hybrid beamforming may be considerably lowered.

According to one embodiment of the present invention, it is able to estimate a direction of a UE with reference to a base station based on a gain difference between a bounded beam and a reference beam. As mentioned in the foregoing description, if a distance between a UE and a base station is fixed, when a direction of the UE varies by drawing a circle, a gain of a reference beam does not vary. Yet, a gain of a bounded beam varies depending on the direction of the UE. A gain difference between a bounded beam and a reference beam, which is disclosed in Formula 19, varies depending on the direction of the UE as well. Using these properties, it is able to estimate the direction of the UE based on the gain difference between the bounded beam and the reference beam.

Meanwhile, it is difficult to determine an accurate direction of a UE using a gain of a bounded beam only. The reason for this is that combinations of a distance and direction between a base station and a user equipment, having the same gain of a bounded beam, may possibly exist. For instance, a case A (e.g., a direction of a user equipment: 0, a distance between a user equipment and a base station: 10, a steering angle of a bounded beam: 0) and a case B (e.g., a direction of a user equipment: 15, a distance between a user equipment and a base station: 5, a steering angle of a bounded beam: 0) may have the same gain of the bounded beam. It is necessary to normalize a variation of a beam gain appearing in accordance with a distance difference between a base station and a user equipment. For such normalization, according to one embodiment of the present invention, a reference beam can be used.

Since it is able to estimate a UE direction from a gain difference between a reference beam and a bounded beam, a direction of a digital beamforming can be eventually determined through the gain difference between the reference beam and the bounded beam. So to speak, a PMI of the digital beamforming can be determined through the gain difference between the reference beam and the bounded beam.

Table 3 shows one example of a codebook in which a PMI of a digital beamforming is mapped to a gain difference ($G_{diff}$) between a reference beam and a bounded beam.

TABLE 3

| Analog beam index (beam ID) | Gain difference (dB) | PMI |
|---|---|---|
| Beam #1 (Boresight = 0°) | $G_1$ | $P_1$ |
|  | $G_2$ | $P_2$ |
|  | . | . |
|  | . | . |
|  | . | . |
|  | $G_L$ | $P_L$ |
| Beam #2 (Boresight = 30°) | $G_1$ | $P_{L+1}$ |
|  | $G_2$ | $P_{L+2}$ |
|  | . | . |
|  | . | . |
|  | . | . |
|  | $G_L$ | $P_{2L}$ |
| . | . | . |
| . | . | . |
| . | . | . |

For instance, a user equipment measures a bounded beam formed by an analog beamforming and feeds back a gain difference ($G_{diff}$) from a reference beam to a base station. From Table 3, the base station selects a PMI or a digital beamforming vector corresponding to the gain difference. Based on the gain difference ($G_{diff}$), the base station can estimate an accurate direction of the user equipment in the bounded beam. Meanwhile, since the base station needs information on a steering angle of the bounded beam, the user equipment can feed back the information on the steering angle of the bounded beam to the base station. For instance, the user equipment can feed back information indicating whether the bounded beam measured by the user equipment is 0° or 30° to the base station. According to another embodiment, in accordance with a timing of a feedback from the user equipment, the base station can obtain information indicating that the corresponding feedback is related to a bounded beam at a prescribed angle. According to another embodiment, the user equipment measures respective steering angles during 360° rotation of the bounded beam, the user equipment respectively calculates gains differences between the measured bounded beams and the reference beams and is then able to feed back the calculated gain differences to the base station. Meanwhile, a specific timing and steering angle for the base station to form a bounded beam are previously defined, broadcasted through a system information, or sent to the user equipment through RRC signaling. On the other hand, information on a steering angle may be included in a signal transmitted through each bounded beam, by which the present invention is non-limited.

Since a base station is able to obtain a UE located direction owing to a feedback of a gain difference ($G_{diff}$), a user equipment may not perform a measurement and feedback for each of an analog beamforming and a digital beamforming separately. And, a hybrid beamforming can be performed with a single measurement and feedback.

Meanwhile, a user equipment directly selects a PMI from Table 3 and may report it to a base station. The PMI may be transmitted to the base station together with a gain difference ($G_{diff}$). Yet, it is not mandatory for the base station to be restricted by the PMI transmitted by the user equipment.

According to another embodiment, in order to reduce a feedback load on a gain difference ($G_{diff}$), or in case that it is difficult to determine an accurate PMI with a gain difference ($G_{diff}$) only (e.g., NLOS environment, High Doppler environment, low reference beam density, etc.), a codebook having a gain difference mapped to a plurality of PMIs shown in Table 4 may be usable.

In case that n PMIs are mapped to a single gain difference, a user equipment can perform a feedback on a digital beamforming information (e.g., PMI) in order to enable a base station to select a prescribed PMI from the n PMIs. In this case, since a feedback amount can be defined as $\log_2 n$, a size of a feedback for a digital beamforming is very small relatively.

TABLE 4

| Analog beam index (beam ID) | Gain difference (dB) | PMI |
|---|---|---|
| Beam #1 (Boresight = 0°) | $G_1$ | {$P_1, P_2$} |
| | $G_2$ | {$P_2, P_3$} |
| | . | . |
| | . | . |
| | . | . |
| | $G_L$ | {$P_L, P_{L+1}$} |
| Beam #2 (Boresight = 30°) | $G_1$ | {$P_{L+1}, P_{L+2}$} |
| | $G_2$ | {$P_{L+2}, P_{L+3}$} |
| | . | . |
| | . | . |
| | . | . |
| | $G_L$ | {$P_{2L}, P_{2L+1}$} |
| . | | |
| . | | |
| . | | |

In Table 4, some PMIs are duplicately mapped to different gain differences ($G_{diff}$), by which PMIs are non-limited. In order to reduce a feedback overhead, a PMI value may not be duplicately mapped.

Meanwhile, in case that a difference value of the same beam gain in a bounded beam appears in two different direction, a base station may not be able to accurately obtain a direction of a user equipment. For instance, referring to FIG. 12, a steering angle of a bounded beam is assumed as 0. And, a user equipment is assumed as located in a direction of +α angle. In this case, using a gain difference ($G_{diff}$) measured by the user equipment only, a base station is unable to recognize whether the user equipment is located in the +α angle direction or −α angle direction. The reason for this is that the +α angle direction located case of the user equipment and the −α angle direction located case of the user equipment have the same gain difference ($G_{diff}$).

Figure 12:
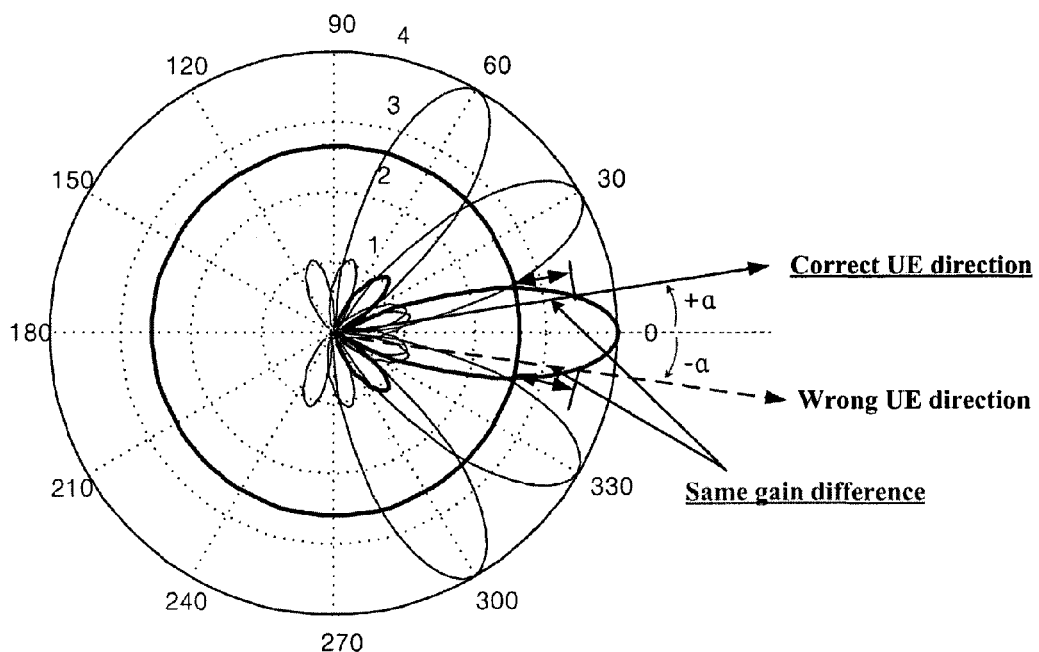
FIG. 12 is a diagram for one example of a method of determining a direction of a user equipment according to one embodiment of the present invention.

According to one embodiment, a user equipment can transmit information on steering angles of 2 bounded beams having the highest gain of a beam to a base station. If the user equipment is located in +α angle direction, the steering angles of the two bounded beams having the highest gain among the 5 bounded beams shown in FIG. 12 are 0° and 30°. If the user equipment is located in −α angle direction, the steering angles of the two bounded beams having the highest gain among the 5 bounded beams shown in FIG. 12 are 0° and 330°. Hence, the base station is able to know whether the user equipment is located in the +α angle direction or −α angle direction.

According to another embodiment, a user equipment is able to know whether the user equipment itself is located in +α angle direction or −α angle direction through steering angles of 2 bounded beams having the highest gain among bounded beams. For instance, the user equipment can transmit information (e.g., 1-bit information), which indicates whether the user equipment itself is located in a clockwise direction or a counterclockwise direction with reference to a boresight of a bounded beam, to a base station.

Thus, according to one embodiment of the present invention, it is able to implicitly estimate a PMI for a digital beamforming using a feedback of an analog beamforming only. Through this, a feedback overhead of a user equipment can be reduced and beam control complexity of a base station can be lowered.

Meanwhile, it is not necessary for an applicable scope of the embodiments mentioned in the foregoing description to be limited to a hybrid beamforming. For instance, in a configuration that an analog beamforming stage is replaced by a digital beamforming stage, the present embodiments are applicable. A digital beamforming may be performed sequentially and serially on each antenna subgroup through an antenna subgrouping. Thus, the present embodiments are applicable in a digital beamforming scheme having this hierarchical structure.

For clarity, the foregoing description is made with reference to a downlink, by which the present invention is non-limited. The present embodiments are applicable to various combinations of transmitters and receivers. For instance, the present embodiments are applicable to an uplink transmission scenario for a user equipment-to-base station transmission, an inter-user equipment (e.g., D2D, V2V, etc.) signal transmission scenario, an inter-base station (e.g., relay, wireless backhaul, etc.) signal transmission scenario and the like.

Figure 13:
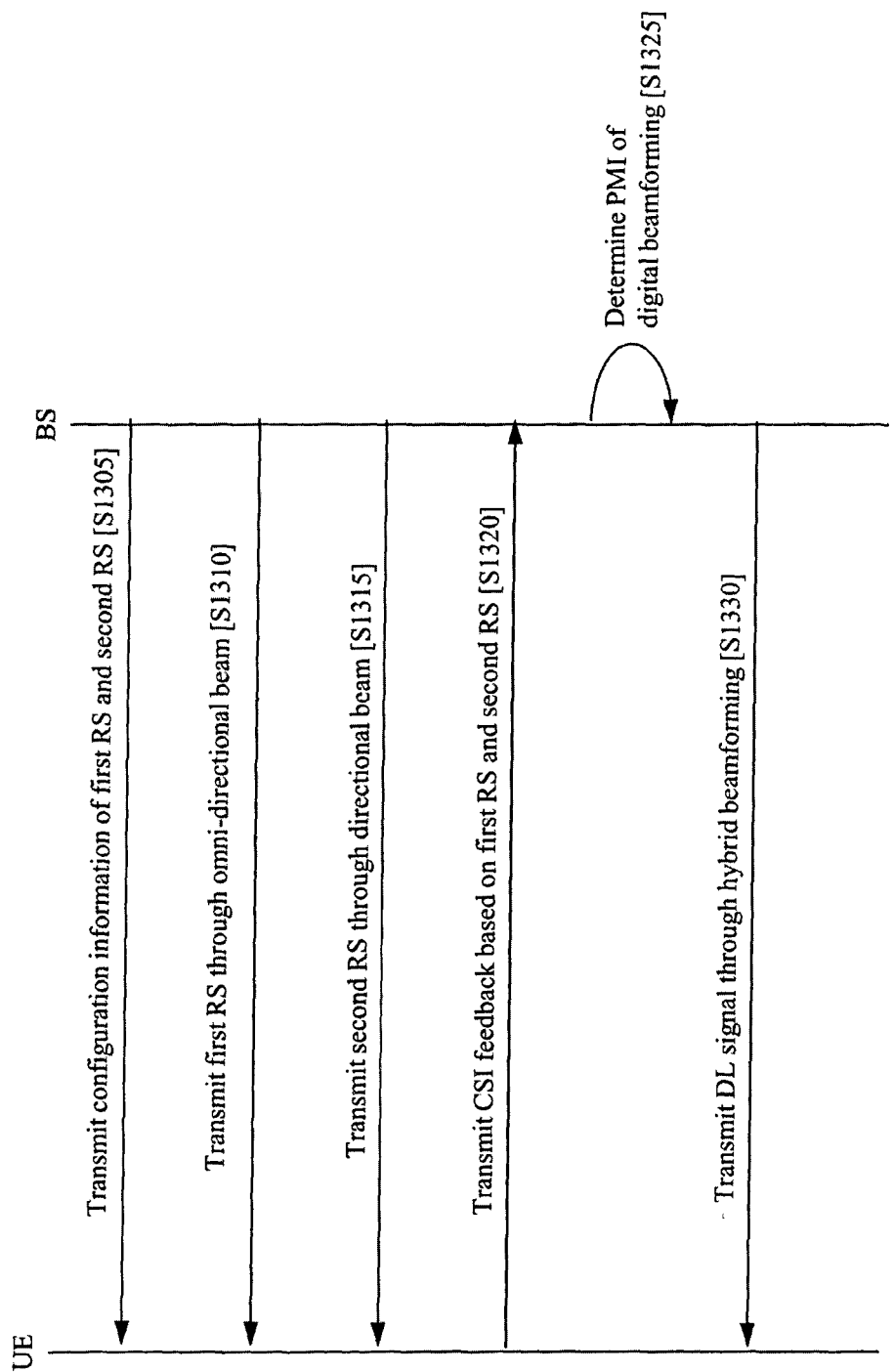
FIG. 13 is a diagram of a feedback method for a hybrid beamforming according to one embodiment of the present invention.

FIG. 13 is a diagram of a feedback method for a hybrid beamforming according to one embodiment of the present invention. Details redundant with the foregoing description shall be omitted from the following description.

Referring to FIG. 13, a base station transmits configuration informations of a first signal and a second signal to a user equipment [S1305]. In particular, the first signal may include a reference signal transmitted through a reference beam and the second signal may include a reference signal transmitted through a bounded beam. A transmission timing (e.g., period, subframe number, etc.) of a signal, information on a pattern having a signal mapped to a time-frequency resource element, information on an antenna port for transmitting a signal and the like may be included in the signal configuration information, by which the signal configuration information may be non-limited.

The base station transmits the first signal to the user equipment through an omni-directional beam [S1310]. In this case, the omni-directional beam may include a reference beam having gains formed equally in all directions. And, the omni-directional beam may be periodically transmitted.

The base station transmits the second signal to the user equipment through a directional beam [S1315]. In this case, the directional beam may include a bounded beam formed with reference to a specific direction. The base station is able to rotate the directional beam by a uniform unit angle in accordance with a period. For instance, the base station can rotate the directional beam by 30° unit in a clockwise or counterclockwise direction. The directional beam has a maximum gain in a boresight direction. As the directional beam gets distant from the boresight, a gain of the direction beam decreases.

A directional beam is an analog beam formed through an analog beamforming and is able to indicate an angle range for forming a hybrid beam. It is able to form a directional beam using just prescribed RF chains selected from a plurality of RF (radio frequency) chains for performing an analog beamforming. In this case, the prescribed RF chains may be selected based on a plurality of antenna patterns (e.g., Table 2) for forming directional analog beams equivalent to each other.

The user equipment receives the first signal through the omni-directional beam and also receives the second signal through the directional beam. Based on the received first and second signals, the user equipment measures a gain of the omni-directional beam and a gain of the directional beam.

The user equipment transmits a channel state information (CSI) including a gain difference between the directional beam and the omni-directional beam to the base station [S1320]. In this case, the CSI may further include an indicator indicating whether the user equipment is located in a clockwise direction or a counterclockwise direction from a boresight direction of the directional beam. Moreover, the CSI may further include information on a direction having a highest (i.e., maximum) gain of the directional beam and a direction having a second highest gain of the directional beam.

Based on the received CSI, the base station determines a PMI of a digital beamforming [S1325]. Based on the CSI, the base station is able to determine a user equipment located direction. Based on the determined direction, the base station is then able to determine a direction of the digital beamforming in a hybrid beamforming. The direction of the digital beamforming in the hybrid beamforming may be determined depending on the gain difference between the directional beam and the omni-directional beam. For instance, the base station can determine PMI based on Table 3 or Table 4. The analog beamforming in the hybrid beamforming may be performed in a direction equal to the directional beam formed direction.

The base station performs the hybrid beamforming based on the determined direction of the digital beamforming and a direction of an analog beamforming. Through the hybrid beamforming, the base station transmits a downlink signal to the user equipment [S1330].

Figure 14:
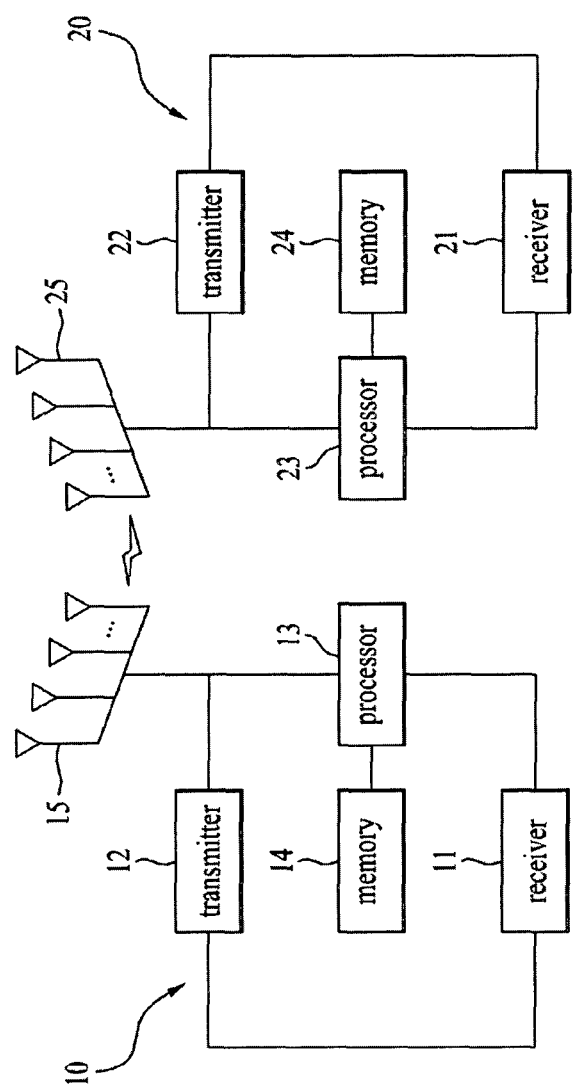
FIG. 14 is a diagram of a base station and a user equipment according to one embodiment of the present invention.

FIG. 14 is a diagram of a configuration of a base station and a user equipment according to one embodiment of the present invention. A base station 10 and a user equipment 20 shown in FIG. 14 can perform the methods mentioned in the foregoing description and redundant details shall be omitted from the following description.

Referring to FIG. 14, a base station 10 may include a receiver 11, a transmitter 12, a processor 13, a memory 14 and a plurality of antennas 15. In this case, a plurality of the antennas 15 may mean a base station supportive of MIMO transmission and reception. The receiver 11 may receive various signals, data and information in uplink from a user equipment. The transmitter 12 may transmit various signals, data and information in downlink to a user equipment. And, the processor 13 may control overall operations of the base station 10.

And, the processor 13 of the base station 10 may perform a function of operating and processing information received by the base station 10, information to be externally transmitted and the like. The memory 14 can store the operated and processed information and the like for a prescribed time and may be substituted with such a component as a buffer (not shown in the drawing) or the like.

According to one embodiment, the transmitter 12 transmits a first signal through a directional beam formed with reference to a first direction. The transmitter 12 transmits a second signal through an omni-directional beam equivalently formed in all directions. The receiver 11 receives CSI including a gain difference between the directional beam and the omni-directional beam from a user equipment. The processor 13 determines a direction of a digital beamforming in a hybrid beamforming in accordance with the gain difference between the directional beam and the omni-directional beam. The processor 13 determines a direction of an analog beamforming in the hybrid beamforming in accordance with a first direction.

A user equipment 20 may include a receiver 21, a transmitter 22, a processor 23, a memory 24 and a plurality of antennas 25. In this case, a plurality of the antennas 25 may mean a user equipment supportive of MIMO transmission and reception. The receiver 21 may receive various signals, data and information in downlink from a base station. The transmitter 22 may transmit various signals, data and information in uplink to a base station. And, the processor 23 may control overall operations of the user equipment 20.

And, the processor 23 of the user equipment 20 may perform a function of operating and processing information received by the user equipment 20, information to be externally transmitted and the like. The memory 24 can store the operated and processed information and the like for a prescribed time and may be substituted with such a component as a buffer (not shown in the drawing) or the like.

According to one embodiment, the processor 23 respectively measures a gain of a directional beam formed with reference to a first direction and a gain of an omni-directional beam equivalently formed in all directions. The transmitter 22 transmits a CSI including a gain difference between the directional beam and the omni-directional beam to a base station. A direction of a digital beamforming in a hybrid beamforming is determined in accordance with the gain difference between the directional beam and the omni-directional beam. And, a direction of an analog beamforming in the hybrid beamforming is determined in accordance with a first direction.

Embodiments of the present invention can be implemented using various means. For instance, embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

The invention claimed is:

1. A method of transmitting channel state information (CSI) for hybrid beamforming from a user equipment (UE) in a wireless communication system, the method comprising:

measuring a gain of a directional analog beam formed with reference to a first direction and a gain of an omni-directional beam formed equivalently in all directions; and transmitting the CSI including a gain difference between the directional analog beam and the omni-directional beam to a base station, wherein a direction of a digital beamforming in the hybrid beamforming is determined in accordance with a UE direction with respect to the base station, and the UE direction is estimated without using a precoding matrix by utilizing the gain difference between the directional analog beam and the omni-directional beam, wherein the precoding matrix for the digital beamforming is determined from the determined direction of the digital beamforming, and wherein a direction of an analog beamforming in the hybrid beamforming is determined in accordance with the first direction.

2. The method of claim 1, wherein the directional analog beam indicates an angle range where a hybrid beam is formable.

3. The method of claim 1,
wherein the directional analog beam is formed using prescribed radio frequency (RF) chains selected from a plurality of RF chains performing the analog beamforming, and
wherein the prescribed RF chains are selected based on a plurality of antenna patterns forming directional analog beams equivalent to each other.

4. The method of claim 1, wherein the CSI further comprises an indicator indicating whether the user equipment is located in a clockwise direction or a counterclockwise direction from the first direction.

5. The method of claim 1,
wherein the directional analog beam is rotated by a prescribed unit angle, and
wherein the CSI further comprises information on a direction having a maximum gain of the directional analog beam and a direction having a second highest gain of the directional analog beam according to the rotation of the directional analog beam.

6. A method of receiving channel state information (CSI) for hybrid beamforming by a base station in a wireless communication system, the method comprising:
transmitting a first signal through a directional analog beam formed with reference to a first direction;
transmitting a second signal through an omni-directional beam formed equivalently in all directions; and
receiving the CSI including a gain difference between the directional analog beam and the omni-directional beam from a user equipment (UE),
wherein a direction of digital beamforming in the hybrid beamforming is determined in accordance with a UE direction with respect to the base station, and the UE direction is estimated without using a precoding matrix by utilizing the gain difference between the directional analog beam and the omni-directional beam,
wherein the precoding matrix for the digital beamforming is determined from the determined direction of the digital beamforming, and
wherein a direction of an analog beamforming in the hybrid beamforming is determined in accordance with the first direction.

7. The method of claim 6, wherein the directional analog beam indicates an angle range where a hybrid beam is formable.

8. The method of claim 6,
wherein the directional analog beam is formed using prescribed radio frequency (RF) chains selected from a plurality of RF chains performing the analog beamforming, and
wherein the prescribed RF chains are selected based on a plurality of antenna patterns forming directional analog beams equivalent to each other.

9. The method of claim 6, wherein the CSI further comprises an indicator indicating whether the user equipment is located in a clockwise direction or a counterclockwise direction from the first direction.

10. The method of claim 6,
wherein the directional analog beam is rotated by a prescribed unit angle, and
wherein the CSI further comprises information on a direction having a maximum gain of the directional analog beam and a direction having a second highest gain of the directional analog beam according to the rotation of the directional analog beam.

11. The method of claim 6, further comprising:
determining a direction where the user equipment is located from the base station is based on the CSI.

12. A user equipment (UE) of transmitting channel state information (CSI) for hybrid beamforming in a wireless communication system, the user equipment comprising:
a processor for measuring a gain of a directional analog beam formed with reference to a first direction and a gain of an omni-directional beam formed equivalently in all directions; and
a transmitter for transmitting the CSI including a gain difference between the directional analog beam and the omni-directional beam to a base station,
wherein a direction of digital beamforming in the hybrid beamforming is determined in accordance with a UE direction with respect to the base station, and the UE direction is estimated without using a precoding matrix by utilizing the gain difference between the directional analog beam and the omni-directional beam,
wherein the precoding matrix for the digital beamforming is determined from the determined direction of the digital beamforming, and
wherein a direction of an analog beamforming in the hybrid beamforming is determined in accordance with the first direction.

13. A base station of receiving channel state information (CSI) for hybrid beamforming in a wireless communication system, the base station comprising:
a transmitter for transmitting a first signal through a directional analog beam formed with reference to a first direction, and for transmitting a second signal through an omni-directional beam formed equivalently in all directions;
a receiver for receiving the CSI including a gain difference between the directional analog beam and the omni-directional beam from a user equipment (UE); and
a processor for determining a direction of digital beamforming in the hybrid beamforming in accordance with a UE direction with respect to the base station, for estimating the UE direction without using a precoding matrix by utilizing the gain difference between the directional analog beam and the omni-directional beam, for determining the precoding matrix for the digital beamforming from the determined direction of the digital beamforming, and for determining a direction of an analog beamforming in the hybrid beamforming in accordance with the first direction.

* * * * *